E. C. WALTER.
TRAVELING COMPUTING ATTACHMENT.
APPLICATION FILED JULY 6, 1911.

1,295,396.

Patented Feb. 25, 1919.
8 SHEETS—SHEET 1.

Witnesses

Inventor
E. C. Walter,
By Edmund H. Parry
Attorney

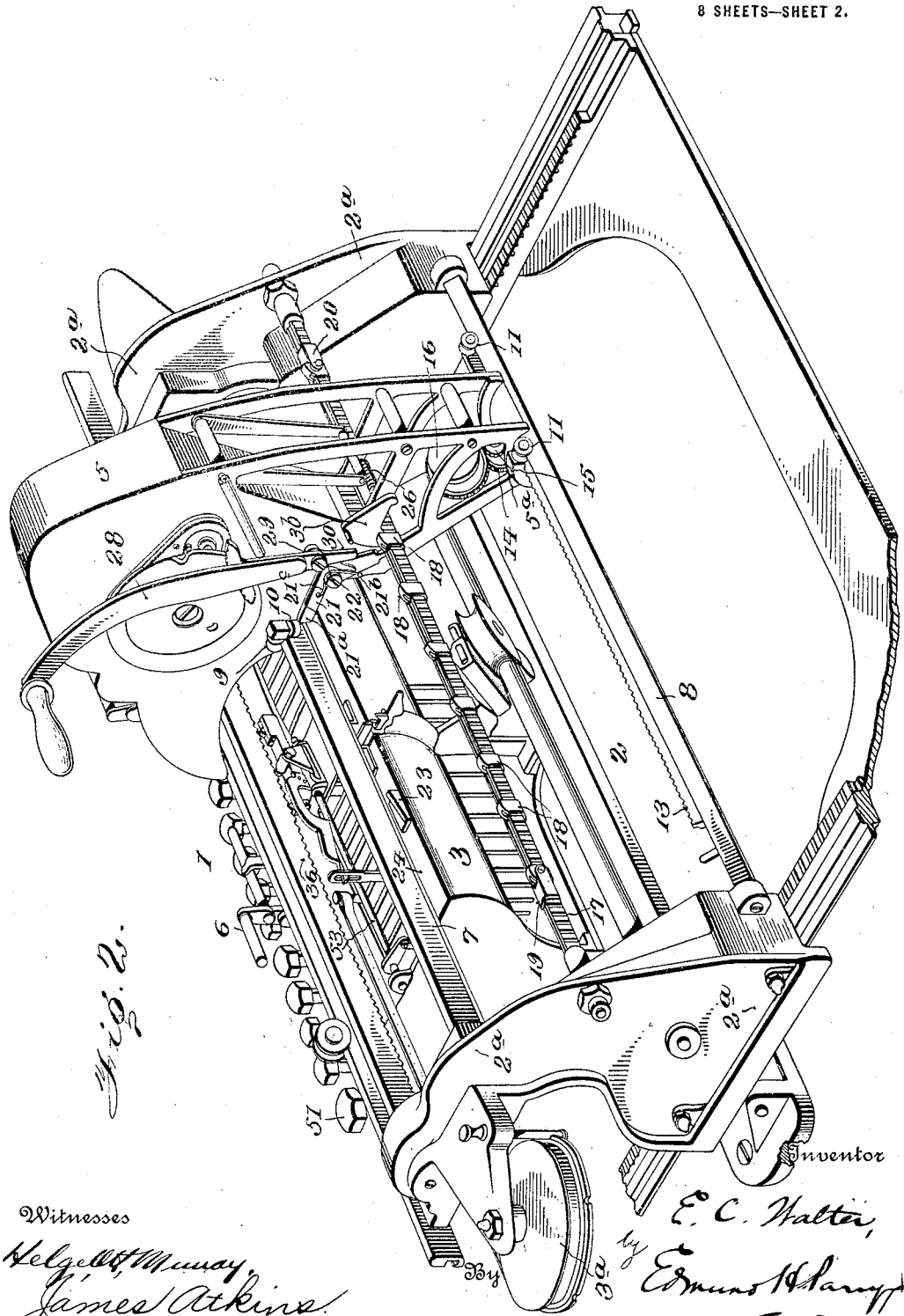

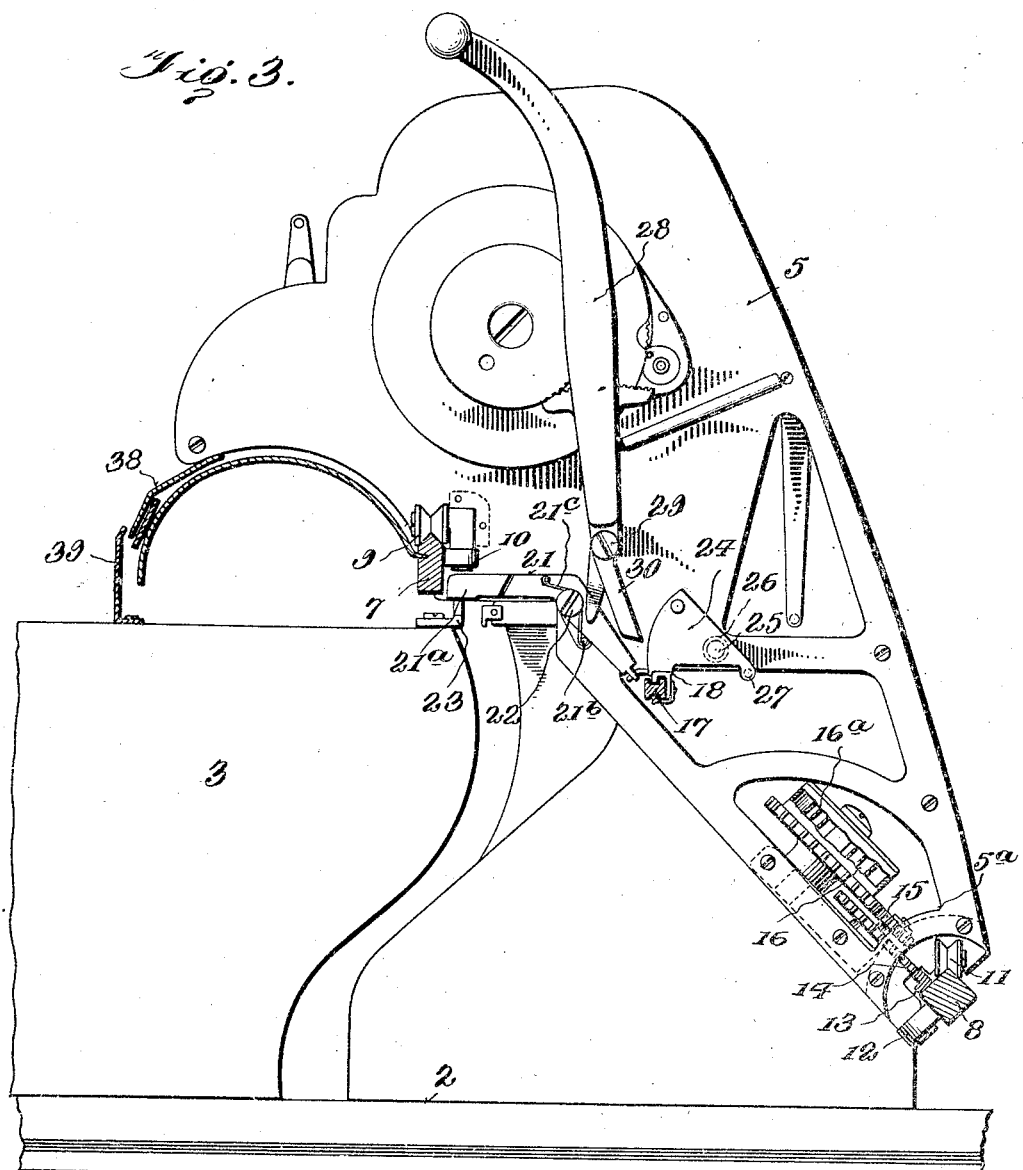

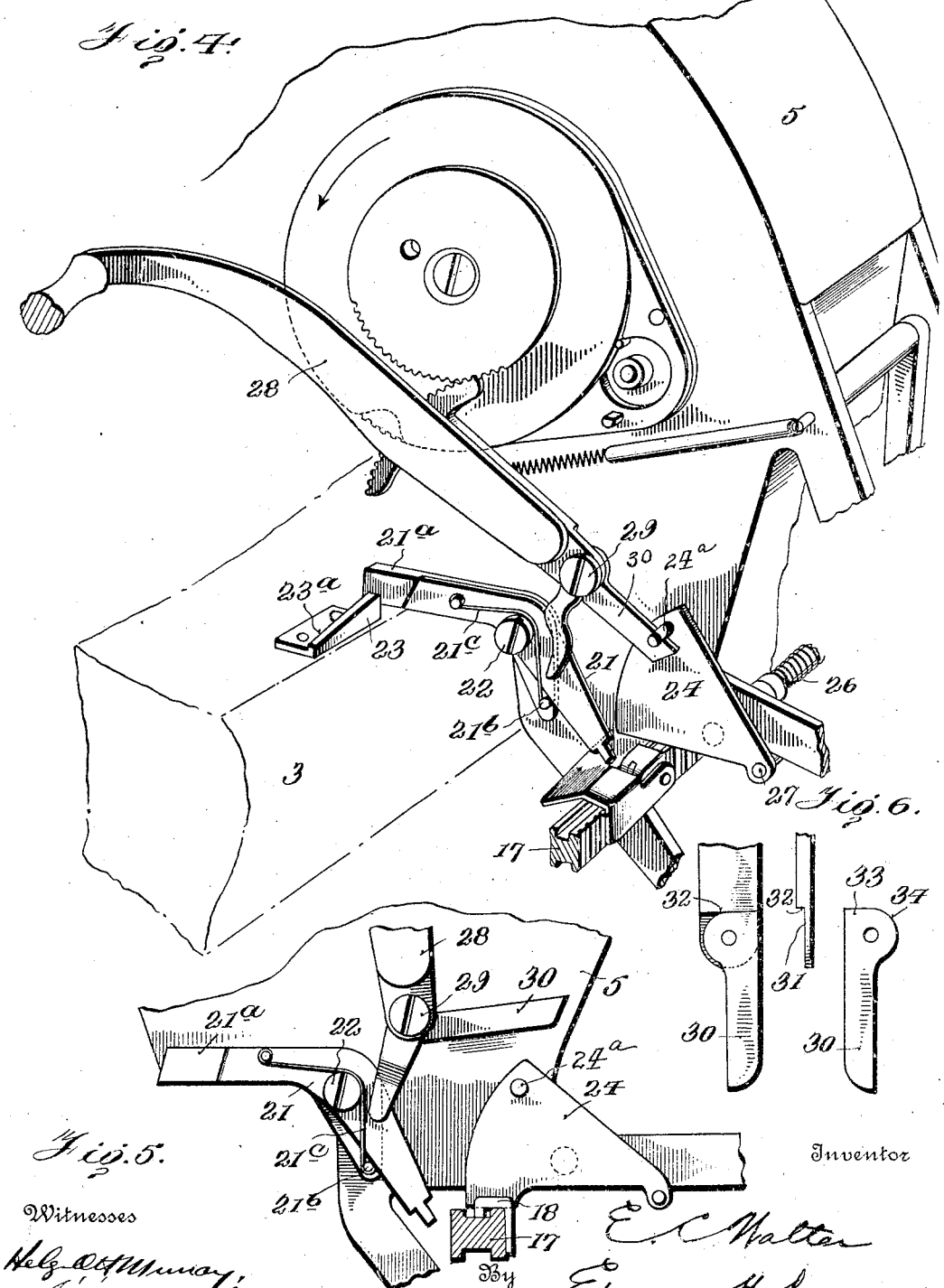

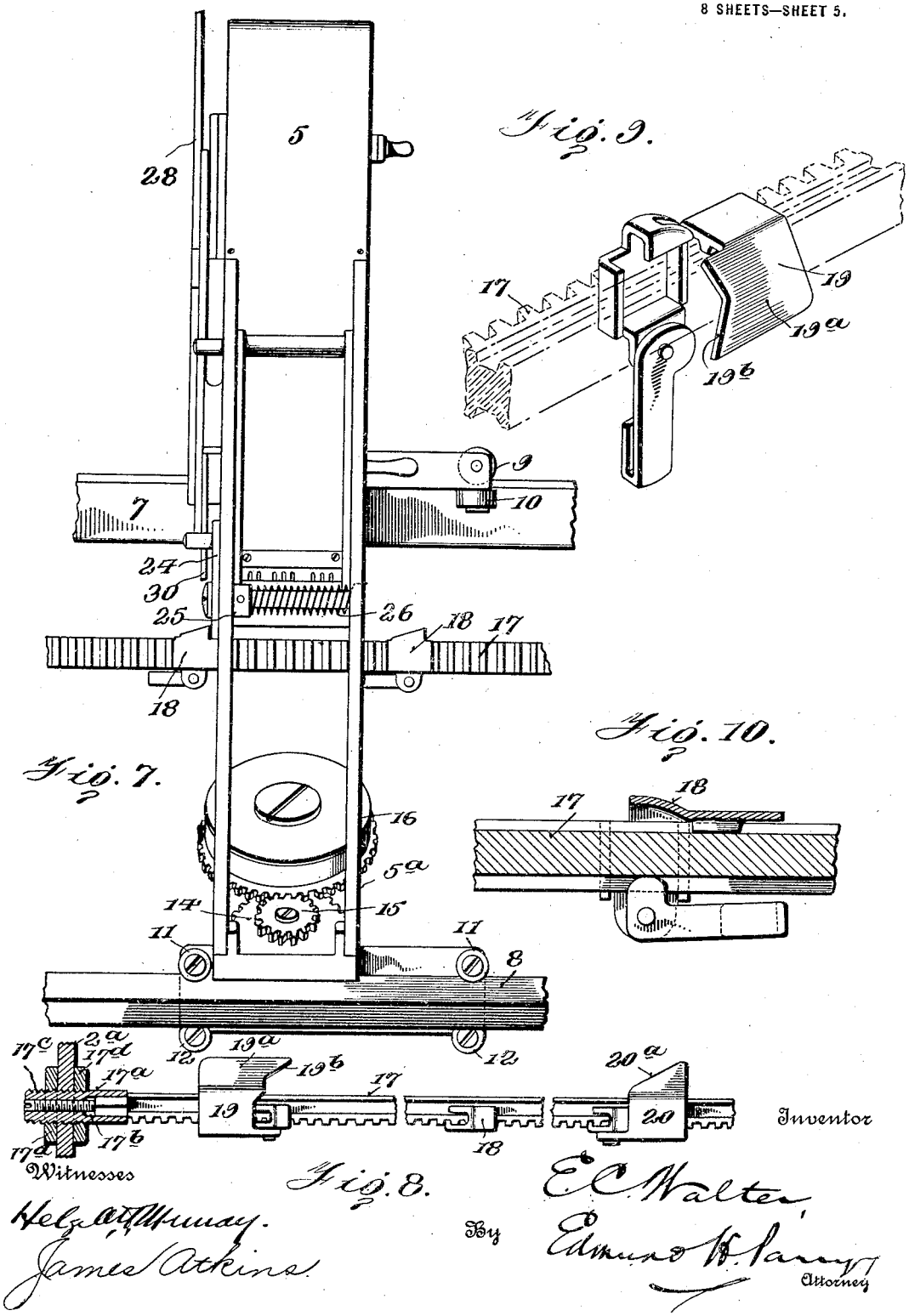

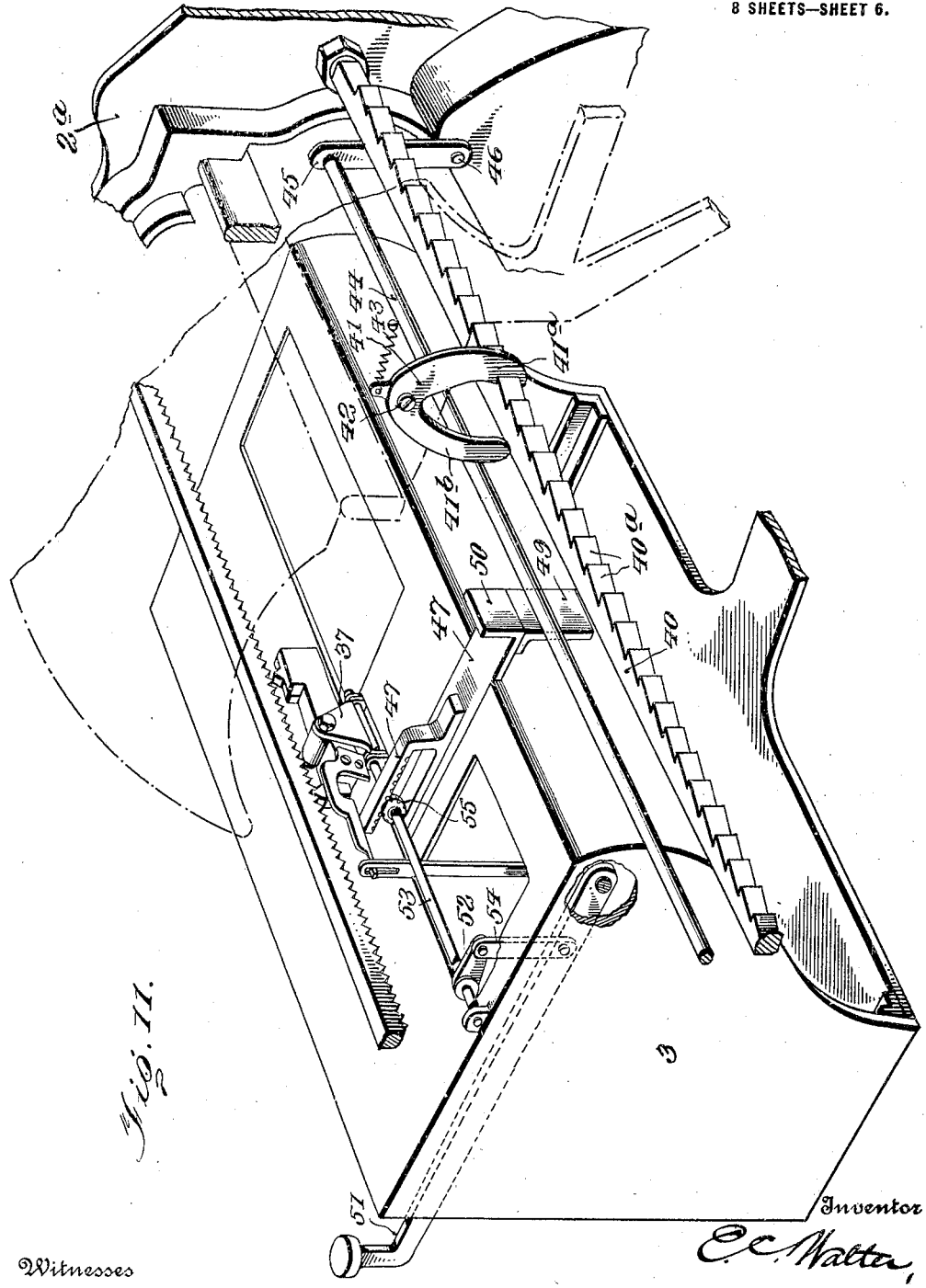

E. C. WALTER.
TRAVELING COMPUTING ATTACHMENT.
APPLICATION FILED JULY 6, 1911.

1,295,396.

Patented Feb. 25, 1919.
8 SHEETS—SHEET 7.

Witnesses
Helzett Hunay.
James Atkins.

Inventor
E C Walter
By
Edmund H. Parry
Attorney

E. C. WALTER.
TRAVELING COMPUTING ATTACHMENT.
APPLICATION FILED JULY 6, 1911.
1,295,396.
Patented Feb. 25, 1919.
8 SHEETS—SHEET 8.
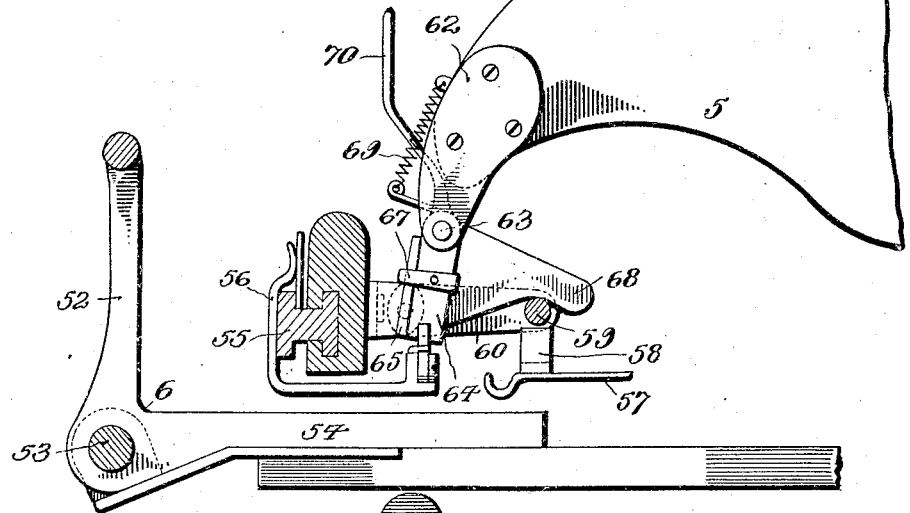
Fig. 14.
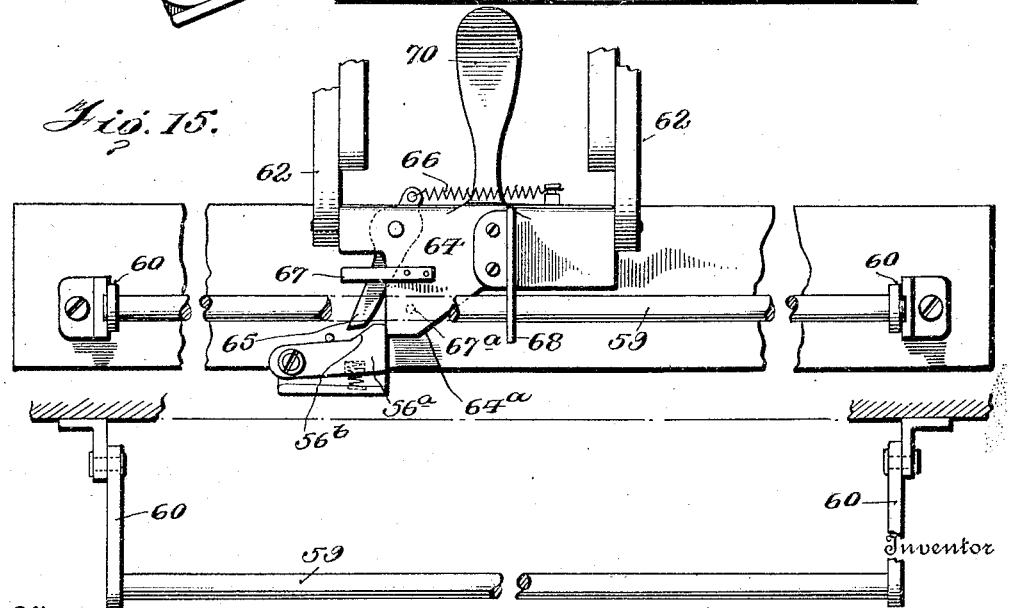
Fig. 15.
Fig. 16.
Witnesses
Inventor
E. C. Walter
By Edmund H. Parry
Attorney

UNITED STATES PATENT OFFICE.

EDWARD C. WALTER, OF NEW YORK, N. Y., ASSIGNOR TO HARRY T. AMBROSE, OF ORANGE, NEW JERSEY.

TRAVELING COMPUTING ATTACHMENT.

1,295,396.   Specification of Letters Patent.   Patented Feb. 25, 1919.

Application filed July 6, 1911. Serial No. 637,200.

*To all whom it may concern:*

Be it known that I, EDWARD C. WALTER, a citizen of the United States, residing at New York, in the county of New York and State of New York, have invented certain new and useful Improvements in Traveling Computing Attachments, of which the following is a specification, reference being had therein to the accompanying drawing.

This invention relates to computing machines and particularly to the class which includes a computing machine coöperatively combined with a typewriting machine.

The object of the invention is to provide a structure of the kind referred to wherein the computing machine is adapted to be shifted on a suitable support into any of a plurality of operating positions, whereby it may be utilized to compute for several different columns, or to compute for a series of amounts crosswise of the work-sheet.

Another object is to provide mechanism for effecting a movement of the computer on its support, and means for controlling the operation of such mechanism.

A further object is to provide means for controlling such movement of the computer, including devices for arresting it at predetermined points in its movement.

A further object is to provide self-propelling means for effecting a movement of the computer on its support in one direction and means thereon to co-act with means carried by the typewriting machine for effecting a return movement of the computer under the control of a part of the typewriting machine.

A further object is to provide means for effecting a coöperative engagement of a part of the typewriting machine with the computer to effect a return movement of the latter to normal position, such means remaining inactive when said computer is moved in the opposite direction and independently of said coöperating part of the typewriting machine.

A further object is to provide a structure which includes a typewriting machine having a carriage, a tabulator-device arranged in juxtaposition to said carriage, and a computer arranged contiguous to said tabulator, with coöperating means carried by these several instrumentalities for controlling the movement of any one or more of them by other of the instrumentalities.

With these and other objects in view, the invention resides in the structures, mechanism, devices and instrumentalities, and in the construction and relative arrangement of these, all as more fully hereinafter described and claimed.

In the accompanying drawings, I have, by way of example, illustrated embodiments of my invention; but it is to be understood that such embodiments may be modified without departing from the spirit of my invention.

In these drawings:

Fig. 2 is a similar view from the rear;

Fig. 3 is a view in side elevation of a part of the structure appearing in Figs. 1 and 2, certain parts appearing in section;

Fig. 4 is a view in perspective, on an enlarged scale, of a portion of the computer, with the means for actuating the positioning and holding mechanism;

Fig. 5 is a fragmentary view in side elevation showing the position of the parts when the computer-holding mechanism is arranged for retaining the same on its support in a substantially permanent position;

Fig. 6 is a collective view of the lower portion of the actuating lever;

Fig. 7 is a view in rear elevation of the computer as mounted upon its supporting structure;

Fig. 8 is a view in sectional elevation of the computer-rack, with the computer-stops mounted thereon and showing, also, the means for effecting longitudinal adjustment of the rack;

Fig. 9 is a view in detail on an enlarged scale of the right-hand end-stop;

Fig. 10 is a view in sectional elevation of the stop shown in Fig. 9, the same being illustrated as locked to its supporting rack;

Fig. 11 is a view in perspective of a modified form of construction, and whereby the computer is adapted to be shifted in two directions laterally;

Fig. 14 is a view in sectional elevation of a modified form of structure, the same, in this instance, showing the mechanism for controlling the position of the computer by means of a tabulator device;

Fig. 15 is a fragmentary view, in rear elevation thereof; and

Fig. 16 is a view in plan of the means interposed between the computer and tabulator device for actuating the mechanism for connecting the computer to the tabulator-device.

Figure 1:
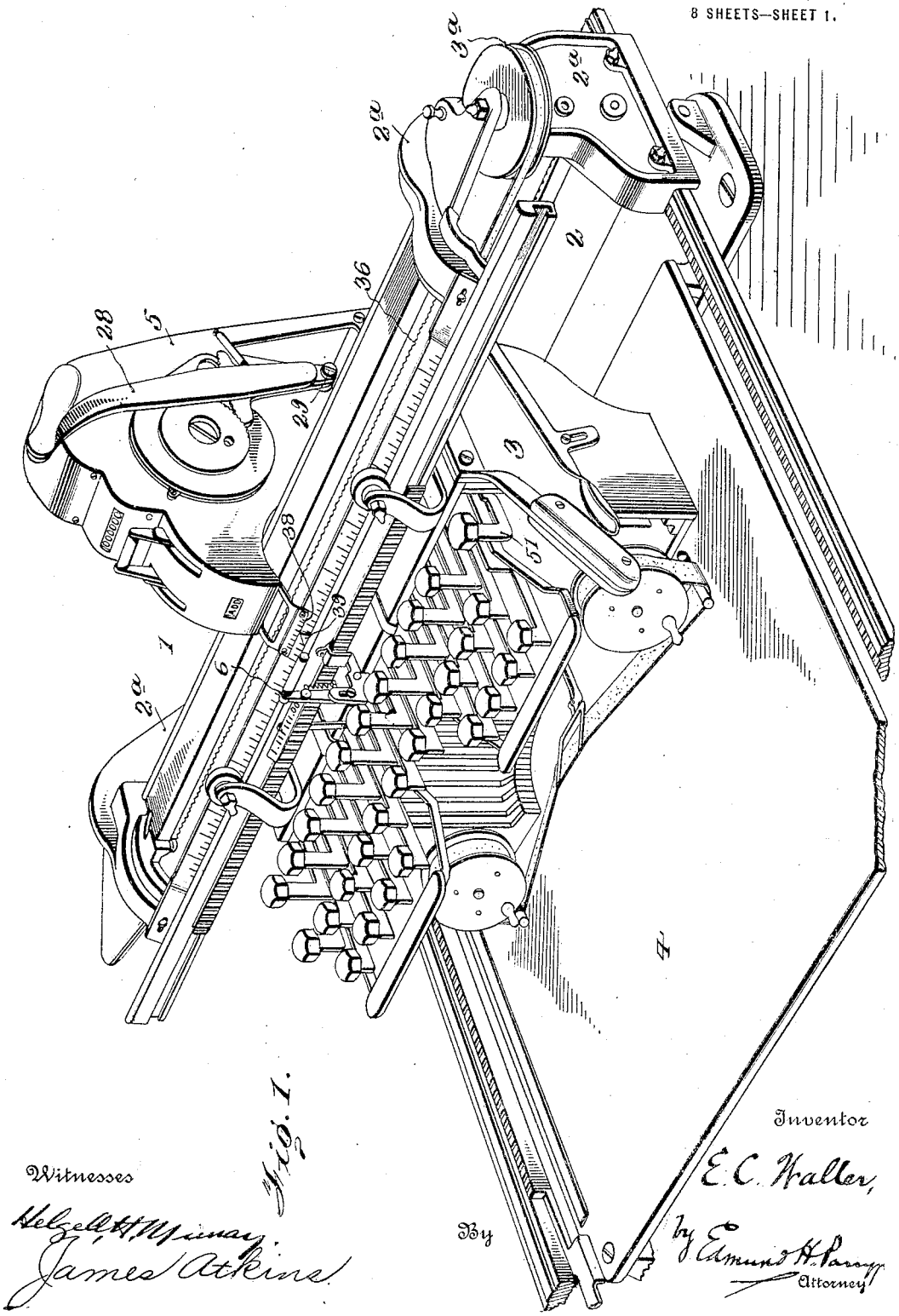
Figure 1 is a view in perspective of a typewriting machine on which is supported a tabulator-device and a computing-machine.

Referring to the drawings, and to Figs. 1 to 12, the numeral 1 designates, generally, a typewriting machine which, in this instance, is of the so-called flat-platen form, and includes a line-spacing carriage designated, generally, by 2, and a letter-spacing carriage, designated, generally, by 3, supported on the line-spacing-carriage 2 in a manner to permit it to travel transversely of an underlying platen 4 under the action of carriage-propelling mechanism 3$^a$.

On the line-spacing carriage is suitably supported a computing machine designated generally by 5.

Suitably supported on the letter-spacing-carriage 3 is a tabulator-device marked 6.

The means for supporting the computing machine on the line-spacing carriage includes the following parts and devices:

Extending between the two side-members 2$^a$ of said line-spacing carriage are two bars 7 and 8. To traverse the bar 7, the computing machine is provided with a pair of rollers 9, preferably of the form shown, and with a pair of guide rollers 10. Similarly, to traverse the bar 8, the computer is provided with a pair of rollers 11, and also with a pair of retaining rollers 12 adapted to travel upon the lower edge of said bar 8.

The means for effecting a traveling movement of the computer in one direction—namely, in the direction of travel of the letter-spacing carriage—includes the following instrumentalities:

The supporting-bar 8 is provided with a rack 13 with which meshes a gear 14 carried by a portion 5$^a$ of the computer. Fastened to the gear is a pinion 15 which, in turn, meshes with the toothed periphery of a spring-actuated barrel 16. These devices constitute a power-device for propelling the computer on its support in the direction of letter-spacing of said carriage 3. It will be seen, therefore, that I have thus provided a self-propelled computer which is adapted to have a movement in two directions.

The means for moving said computer in a direction opposite to its traveling movement includes the following structure:

Adjustably mounted on the members 2$^a$ of the line-spacing carriage is a rack-bar 17, adapted to support one or more computer-arresting elements 18; these elements being, in this instance, computer-stops which are adjustably and removably secured on said rack-bar 17. On said bar are also supported adjustable end-stops 19 and 20. The stop 19 comprises a body-portion 19$^a$ (Figs. 8, 9 and 10) and a cammed extension 19$^b$, against which a bell-crank-lever 21, pivoted at 22 to the side of the computer 5, is adapted to engage. This lever 21 is rocked on its fulcrum 22 when it engages and rides along the cammed extension 19$^b$ of the stop 19, thereby causing the opposite end of said lever to be positioned into the path of travel of a stop 23 mounted on the top-plate 3$^b$ of the letter-spacing carriage 3.

Assuming that the letter-spacing carriage 3 has traveled to a position beyond the computer and is to be returned to starting position, the operator will, by hand, shift said carriage toward the left. In doing so, the stop 23 will be brought into engagement with the bell-crank-lever 21 thereby effecting a connection between the letter-spacing-carriage and the computer, so that the further movement of the carriage will control the position of the computer by shifting it toward the left. This movement of the computer transmits rotation to the spring-actuated barrel 16 and tensions the contained spring 16$^a$ to store power therein for propelling the computer toward the right after it has been released from engagement with the letter-spacing carriage. This release is effected when the bell-crank-lever abuts against and rides upon a cammed projection 20$^a$ of the other end-stop 20 which, as will be understood, will have been disposed on the rack 17 at the left of the stop 19. When the computer has been released from the letter-spacing carriage, the computer self-propelling mechanism, aforementioned, causes the computer to travel toward the right.

The computer stops 18 constitute means for arresting the travel of the computer and positioning it at predetermined points in relation to the work being performed on the work-sheet sustained by the platen 4. To the end that said stops shall perform their defined function, I provide means on the computer for coöperating with them to arrest the movement of the computer when acting under the influence of its self-propelling mechanism. These means comprise, in this instance, a latching-element 24 pivoted at 25 and carrying a stud 24$^a$, on the side of the computer 5, and controlled by a spring 26 which encircles the pivot 25. The latch is provided at its lower edge with a projection or lug 27 adapted to engage with the computer and limit the movement of the latch in one direction.

When said latch engages one or another of said stops 18, the travel of the computer will be positively arrested; and it will then be held at that point while the computation is being effected. This being accomplished, the latch is disengaged from that particular stop, in a manner presently to be described, and the computer is permitted a further travel until it is again arrested by the next adjacent stop 18 to the right. When the last of these stops 18 has been passed, the computer will again engage the right-hand end-stop 19, as already described.

As the letter-spacing carriage must now be again returned to starting position, the operator shifts it toward the left, and by this movement, effects a reëngagement of the carriage with the computer in the manner heretofore explained. As the computer is thus being returned, the latch 24 will trip or latch by the several stops 18.

In such a structure, it is desirable to provide means for controlling the latch in a manner that will be positive and certain, and also convenient: To this end, I utilize a computer-actuating handle 28 fulcrumed at 29 on the side of the computer, and which forms an element in a structure which constitutes the subject-matter of another application of mine, filed July 6, 1911, Serial No. 637,199. It is to be understood that I may provide other means for controlling the latch; but this actuating-handle, being an element already in the structure, provides a convenient means and one which does not necessitate the operation of some auxiliary part, since this handle must be operated, in any event, to produce a computation in the computer, before the latter begins its shifting movement.

The lower end of the handle 28 carries a latch engaging arm 30 and controls the movement of the same in one direction: To this end, the handle is provided with an incut 31 forming a flat-faced shoulder 32, with which coöperates the corner 33 of the latch 30. The corner 34 of the latch opposite to the shouldered portion 33 is rounded, as shown. By this construction, the shoulder 32 will form an abutment for the latch when the handle 28 is rocked on its axis 29 to lift the latch 24. The curved form of the upper end of the latch permits it to be rocked upon its axis 29—this being the same as that of the handle 28—so that, if it is found desirable not to lift the latch at any point, the latch engaging element 30 may be shifted upwardly and out of engagement above the stud 24ª on the latch. This permits the computer to remain stationary in a predetermined position and not be under the control of the letter-spacing carriage, as already explained.

It will be understood that whenever the computer has been brought to a predetermined position, by the engagement of the latch 24 with any one or another of the stops 18, it will be held in that position while printing is being accomplished with the typewriter. In this situation, the letter-spacing carriage 3 will underlie the computer. If, for any reason, the computer should have been shifted so that the latch 21 has been engaged and been actuated by the right-hand end-stop 19 before the letter-spacing carriage has reached a position to be connected with the computer to place the latter under its control, as already described, and if, then, the operator begins to shift the letter-spacing carriage so that the stop 23 thereon may be positioned to the right of the latch 21—which latter will be occupying a position below the plane of the engaging portion of the stop 23 and would, therefore, be engaged thereby and thus prevent the carriage from being shifted to a position beyond the computer, to the right thereof—means must be provided on the bell-crank-lever 21 to permit it to latch by the stop 23: To this end, a latching element 21ª is fulcrumed on the pivot 22 of the bell-crank-lever 21 and at one side thereof. This element extends, in a horizontal direction, beyond the end of the bell-crank-lever 21, and, at its lower end, carries a pin 21ᵇ adapted to engage the edge of the lever 21, as shown, and is controlled by a spring 21ᶜ the function of which is to hold the pin 21ᵇ against the edge of the lever, as described. It will be seen, therefore, that when the inclined face 23ª of the stop 23 on the letter-spacing carriage moves into engagement with the latch-element 21ª, it will rock the same on its fulcrum 22 and permit the stop 23 to pass beyond said element. At the same time, the spring 21ᶜ will have been tensioned so that, when the stop disengages from the latching-element 21ª, and as the lower end of the bell-crank-lever 21 is still in engagement with the end-stop 19, said spring will re-position said latching-element 21ª, so that, when the letter-spacing carriage is being moved in the opposite direction to its starting position, the stop 23 will engage the bell-crank structure, including the lever 21, and thereby connect the computer with the letter-spacing carriage to shift the former to starting position, as heretofore described.

To the end that the rack bar 17, already referred to, may be accurately disposed in order that the teeth thereon will occupy a position corresponding to the teeth on a rack-bar 36,—constituting a component of the escapement-mechanism 37 which controls the letter-spacing carriage—said bar is preferably provided with means for adjusting it longitudinally. These means preferably comprise a sleeve 17ª extending through the member 2ª of the line-spacing carriage and provide at one end with a square socket 17ᵇ adapted to receive the square end of the rack-bar 17 to prevent any rotative movement of the latter. At the opposite end, the sleeve is threaded to receive an adjusting screw 17ᶜ. The sleeve is externally threaded to receive two clamping nuts 17ᵈ which are adapted to engage the opposite faces of the side-members 2ᵃ of the line-spacing carriage, the object of which is to hold the sleeve 17ᵃ fast to the sides 2ᵃ of the carriage. Thus it is seen that the bar 17, being loosely mounted in the socket 17ᵇ of the sleeve 17ᵃ, prevents rotative movement. The bar 17 is adjusted longitudinally when the adjusting screw 17ᶜ is turned to force its inner end against the abutting end of the rack-bar. As the bar 17 is supported at both ends in the manner as described, adjustment in either direction may be obtained. When one of the adjusting screws is turned, the one at the opposite end must be turned to take up lost motion.

It will be understood that the stops 18 are adjustable on bar 17 to position the computer in predetermined positions corresponding to the columns on the work-sheet. Means are also provided to assist the operator in locating the letter-spacing carriage to a position corresponding therewith. These means consist of a scale member 38 attached to the forward end of the computer. This scale being stationary, with the computer, when the latch 24 is abutting against any of the stops 18, the regular type-writer-pointer 39, (upstanding from the top plate of the letter-spacing carriage and in juxtaposition to the plane of the scale 38) may readily be positioned to a location in reference to the scale corresponding to the number of figures in the amount being computed.

Figure 12:
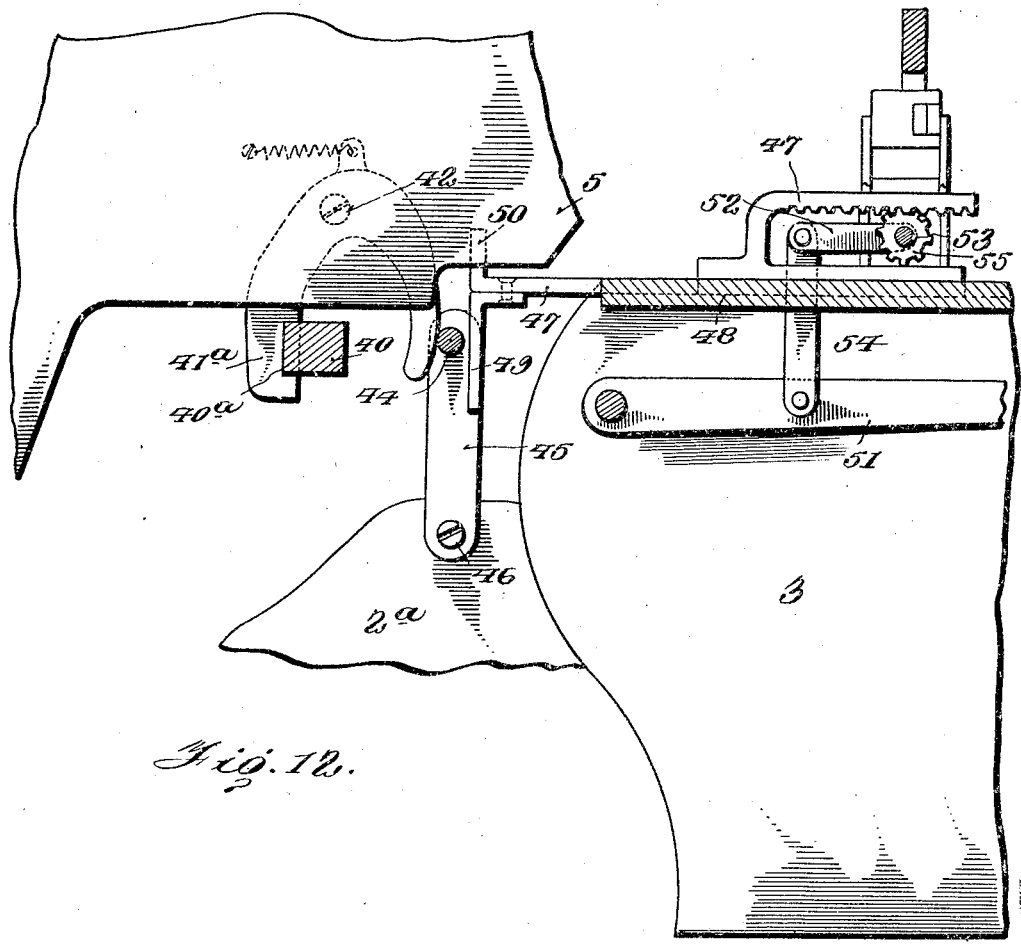
Fig. 12 is a view in sectional elevation of the structure illustrated in Fig. 11.
Figure 13:
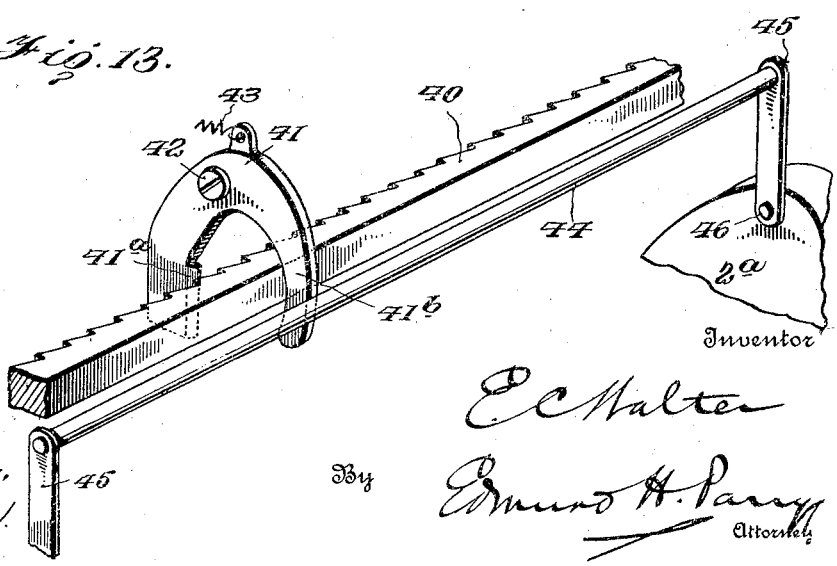
Fig. 13 is a fragmentary view, in perspective, illustrating the instrumentalities for actuating the computer-holding member.

In Figs. 11, 12 and 13 I have disclosed a modification of certain parts of the structure already described: The main difference in the modification is that the plurality of stops on the stop-carrying bar 17 are dispensed with and other means provided, in lieu thereof, for enabling the operator to control the positioning of the computer in both directions of its movement: With this difference in mind, it will first be observed that a somewhat different form of rack-bar is employed. In this instance, the rack-bar 40 is provided with ratchet teeth 40ᵃ. Adapted to coöperate therewith is a computer-arresting means which, in this instance, is a two-armed element 41 pivoted at 42 on the side of the computer and controlled by a spring 43 secured to its upper end and to the side of the computer. The function of the spring is to hold the arm 41ᵃ of the element in engagement with the teeth of the rack-bar 40. Means are provided, under the control of the operator, for disengaging said arresting element 41 from the rack. These means, in the form which I herein illustrate, comprise a transverse bar 44 supported at the upper end of two arms 45 which, at their lower ends, are pivoted to the sides 2ᵃ of the line-spacing carriage and are adapted to rock upon the axis 46. The bar 44 is adapted to be actuated simultaneously with the actuation of the escapement-mechanism 37, already referred to, and which is under the control of the operator. The connection between the escapement-mechanism and the bar 44 is, in this instance, a slide or plunger 47 shiftable in a guide-way 48 in the top plate of the letter-spacing carriage. This slide carries a depending lug 49 adapted to be shifted into engagement with the bar 44. As the bar 44 is of the width of the line-spacing carriage, it will be seen that, no matter what position the letter-spacing carriage may occupy with relation to the line-spacing carriage, the lug 49 can always be positioned against the bar 44 to move it against an arm 41ᵇ of the arresting-element 41 to actuate the latter. As soon as released by the bar 44 the computer, under the influence of the propelling mechanism, already described, will be shifted toward the right until arrested by an upstanding projection 50 of the plunger 47. The computer will be held in contact with this upstanding projection 50 as long as the escapement of the letter-spacing carriage 37 is disengaged from its rack 36; but as soon as the escapement reëngages its rack the plunger 47 is acted upon to give it a retrograde movement and the spring 43 will actuate the pawl 41 into holding engagement with the teeth of rack-bar 40. This, of course, allows the letter-spacing carriage to be moved space-by-space across and beyond the computer, as for writing or for the printing of numbers; but as soon as a transverse release lever 51 (which is actuated by the operator to control the position of the escapement 37 with reference to the rack 36) is again depressed to disengage the escapement from its rack for either a return of the letter-spacing carriage or for a jump to the right, (as for another column, say), the aforementioned plunger 47 will cause the computer to be unlocked from the bar and through the self-propelling means to be again projected to the right until arrested by the upstanding projection 50 of plunger 47. The movement of the plunger is accomplished by the depressing of the transverse release key 51 connecting with an outstanding arm 52 from a shaft 53 and connected to a key 51 by a link 54 the escapement 37 being mounted on shaft 53 and rotatively shifted to disengage from a letter-space rack by the depression of the transverse key 51. Upon shaft 53 and fastened thereon is a pinion 55 which meshes with a toothed portion 47ᵃ of the plunger 47. Thus it is seen that the depression of the transverse key 51 will rock the shaft 53 and the escapement 37 and cause the plunger 47 to be moved rearwardly to release the computer from engagement with the bar 40.

The above described mechanism will allow the computer to be positioned anywhere along the line of writing and in a co-acting and operable position with the letter spacing carriage.

In the employment of computers in connection with typewriter machines, it is frequently desirable, and some times necessary, to utilize a tabulator-device in conjunction therewith. As it is a feature of my invention to control the positioning of the computer through a shiftable carriage, I have devised means whereby the computer may be controlled and located through the letter-spacing carriage and primarily by a tabulator-device carried in part thereby: In Figs. 14, 15 and 16 I have illustrated an exemplification of an embodiment of such a structure, and this I will now proceed to describe:

In this embodiment, the computer is supported in the manner already described, namely, upon the line-spacing carriage. The tabulator-device 6 is supported upon the letter-spacing carriage, as aforementioned. The form of tabulator-device which I may employ is disclosed in United States Letters-Patent No. 970,433, granted September 13th, 1910. For the purpose of this disclosure, it will suffice to state that this tabulator comprises two component parts, to-wit, an actuating-element and a stop-supporting element, the latter arranged in position to permit engagement of the stops carried thereby by the actuating element. This actuating element includes a bell-crank lever 52 fulcrumed and slidably supported upon a shaft 53 suitably mounted on the top plate of the letter-spacing carriage. The lever has a horizontal arm 54 overlying the top plate of the letter-spacing carriage. Disposed in a plane above the normal position of the arm 54 is a stop-carrying bar 55 upon which are adjustably supported one or more engaging stops 56. The rocking of the bell-crank lever upon its fulcrum will position the arm 54 so that it will engage one or another of the stops and, thus, arrest the carriage at any predetermined point as fixed by the particular stop, in the usual manner, and in accordance with the operation of this structure, fully described in the aforementioned patent. Also overlying the arm 54 is an arm 57 carried by an escapement-mechanism (not shown) and adapted to be elevated therewith when the same is rocked, as already described. Upstanding from the arm 57 is a lug 58 which is adapted to engage a transverse rod 59 carried by two arms 60 pivoted to the front rail 61 of the line-spacing carriage.

The structure just described is adapted to actuate an arresting device carried by the computer, as will be presently described.

It is to be understood that the operation of the tabulator mechanism simultaneously, actuates the rod 59 and thereby operates the latching device, to be described, whereby the computer is released to travel under the impulse of the computer-propelling mechanism. It will thus be seen that, until such release is effected, the position of the computer is controlled by the tabulator-device.

The latching-device, aforementioned, which constitutes the active connection between the computer and the tabulator-device, as shown, comprises the following structure: The computer carries at its forward end two arms or projections 62, 62. Fulcrumed at 63 between these arms is an arresting stop or latch member 64, the lower portion of which is adapted to engage with one or another of the aforementioned tabulator-stops 56. This latch carries a pivoted finger 65 which is held in a forwardly-extended operative position by a spring 66 and limited in its swinging movement, in one direction, by a stop 67; and, in the opposite direction, by a stud 67ª. The latch 64 is provided on its rear face with an engaging finger 68 which overlies the rod 59. The raising of the rod 59, in the manner already described, by engaging it with the finger 68, will lift the finger 68 to cause the latch 64 to be rocked on its fulcrum 63. This operation tensions a spring 69, the function of which is to return the latch to normal position when released after the tabulator has been actuated. When the latch 64 has been rocked on its fulcrum 63, as described, it will disengage it from the tabulator-stop which has been operating to hold the computer. The movement of the latch 64 positions the finger 65 into the path of the next tabulator-stop to the right. The loose finger 65 is, as shown, normally in advance and to one side of the abutting edge of the latch 64. At the time that the latch 64 is in engagement with the tabulator-stop, the finger 65 will occupy a position in advance of the abutting edge of the tabulator-stop. When, however, the latch 64 has been actuated and rocked upon its fulcrum, it will pass the stop and permit the computer to move toward the next stop at the right. The movement of the latch 64 will have positioned the finger 65 in the path of the next adjacent tabulator-stop at the right so that it will engage therewith and be moved against the stud 67ª, which will aline the active edges of the finger 65 and the latch 64. When the operator releases her hold upon the bell-crank-lever 52, it will drop to permit the rod 59 to return to normal position and this will permit the spring 69 to perform its function of returning the latch to an abutting position against the stop, thus allowing the finger 65 to again resume its normal advanced position under the influence of its spring 66. This spring 66 will be of sufficient strength to cause the finger 65 to act as a cushioning element when it engages the tabulator stop. Each actuation of the tabulator-device, in the manner described, will permit the computer to move to the next adjacent stop at the right. If, for any reason, it is desired to permit the computer to move to the next stop without operating the tabulator bell-crank lever, the latch 64 may be provided with an arm 70, and with this, the latch may be rocked on its fulcrum, to disengage it from the tabulator stop.

As this latch is so disposed as normally to be in the path to engage each tabulator-stop, it is desirable to provide for a latching-by of the latch when the computer is being returned to starting position. To this end, each of the tabulator-stops is provided with a spring-actuated abutment-piece 56ª, and it is this piece which is engaged by the active edge of the latch 64. The latter is provided with an inclined face 64ª which coöperates with a similarly-inclined face 56ᵇ on the abutment-piece 56ª to rock the same on its fulcrum and permit the latch to ride over the same.

From the foregoing, it will be seen that I have provided, first, a traveling computer and, secondly, means for controlling the position of the computer whereby it may be arrested in its traveling movement at a predetermined point corresponding, for instance, to a particular column of the worksheet. While I am aware that it has heretofore been proposed to shift a computer upon its support, yet, so far as I am aware, this has been done only manually and not by means such as I contemplate. As seen, the computer-controlling means comprise various structures, and these I have described in more or less detail. It is to be understood, however, that, in view of the novelty of my structure generally, I do not confine myself to any particular construction or structure for subserving the described function. Therefore, when I refer herein to means or mechanism for controlling the computer, the understanding is to be that such means or mechanism comprise any one or more of the structures referred to as being adapted to carry out this function.

Having thus described certain exemplifications of structures and mechanisms for carrying my invention into effect, what I claim is:

1. The method of cross footing in a device having the usual computing mechanism and controlling mechanism therefor relatively movable for the insertion of a number, digit by digit; which consists in producing a movement of one of said mechanisms successively from column to column and a movement of the other of said mechanisms step by step in a column and while the successively movable mechanism is at rest in said column, both of said movements being in the same direction.

2. The method of effecting accumulative cross-footing in a single cycle of operations for a plurality of lines of figures in a device provided with an accumulating mechanism and actuating mechanism therefor relatively movable, one of said mechanisms being movable for a predetermined distance in advance of the other mechanism which has a step by step movement past the first-mentioned mechanism, both said movements being in the same direction, said mechanisms also having a simultaneous movement in the reverse direction.

3. A structure of the kind specified including in combination, a support, a carriage, a computer movable independently of the carriage and adapted to produce a computation and shiftable independently of said carriage for producing lineal computation, normally inactive coöperating means carried by said carriage and computer, and means carried by said support for causing mutual engagement of said coöperating means whereby said computer will be shifted on its support by said carriage in at least one direction.

4. In a typewriter having a carriage and a computer relatively movable and a support relative to which both said carriage and said computer are movable in the same direction; a normally inactive coöperative means carried by the carriage and computer and which is brought into action by the relative movement in one direction of the computer and the support for connecting the carriage and computer during their movement relative to said support in the other direction.

5. In a typewriter, the combination of a carriage, a support upon which the carriage is shiftably mounted, a computer shiftably mounted on said support independently of said carriage, normally-inactive coöperating means carried by said carriage and computer and engageable to shift said computer on its support in one direction, means carried by said support and independent of said carriage and computer for effecting a connection between the coöperating means of said carriage and computer, and means independent of the carriage-moving means for effecting a travel of the computer on its support in the opposite direction for producing lineal computation.

6. In a typewriter, the combination of a support, a carriage shiftably mounted thereon, a computer on the support and movable independently of the carriage and shiftable in one direction under the control of the carriage, means carried by the carriage and computer and normally inactive but adapted to be brought into coacting connection by the relative movement in one direction of the computer and the support for effecting simultaneous movement of the carriage and computer, and means carried by the computer for effecting said relative movement.

7. In a typewriter, the combination of a support, a computer movably mounted thereon, a carriage shiftably mounted on the support independently of the computer and disposed to travel in juxtaposition to the computer, carriage-moving means for effecting travel of the carriage in relation to the computer, means independent of the carriage-moving means for effecting travel of the computer independently of the carriage, normally-inactive means coöperating with the carriage and rendered active when the computer is moved in one direction, and means disposed in the path of movement of the normally-inactive means to render the same inactive when the carriage and computer travel in the opposite direction for releasing the computer from the control of the carriage.

8. In a typewriter, the combination of a support, a computer movably mounted thereon, a carriage mounted on the support independently of the computer and disposed to travel in juxtaposition to the computer, means normally inactive but adapted to be brought into play by the relative movement of the carriage and support for connecting the carriage and computer, means independent of the carriage and carried by the computer for effecting such relative movement, means mounted on the support independently of the carriage and computer for positioning the normally-inactive means to connect the computer to the carriage whereby the former, under the control of the latter, is caused to travel in one direction, and means disposed in the path of movement of the normally-inactive means for rendering the same inactive when the carriage and computer travel in the opposite direction for releasing the computer from the control of the carriage.

9. A structure of the kind specified including in combination, a carriage and a computer relatively movable, a support relative to which the carriage and computer are movable in the same direction, means mounted on the support for moving said carriage for the insertion of a number digit by digit, means on the computer and independent of the carriage-moving means for moving the computer on its support successively from column to column, both of said movements being in the same direction and actuating means connected to the computer for releasing it for movement under the influence of the computer-moving means.

10. In a typewriter, a support, a computer disposed thereon, a carriage mounted on said support independent of said computer, a tabulator mounted on said carriage and arranged when operated to release and control said carriage, and normally-inactive means interposed between said tabulator and computer and made active by the operation of said tabulator whereby said computer will also be released.

11. In a typewriter, a support, a traveling computer disposed thereon, a series of stops on said support against any one of which the computer rests, a tabulator arranged in juxtaposition to said computer and stops, and normally inactive means interposed between said tabulator and computer and made active by the operation of said tabulator to release said computer from said stops whereby the same may have a traveling movement.

12. In a typewriter, a support, a traveling computer disposed thereon, a traveling carriage mounted on said support independent of said computer, a tabulator mounted on said carriage and traveling therewith, a series of stops mounted on said support and against one of which said tabulator and computer abuts, and means interposed between said tabulator and computer and operated by said tabulator for releasing said computer from said stops whereby said computer will have a traveling movement until again arrested by another stop in the series and the carriage will have a traveling movement until arrested by said tabulator abutting against said stop.

13. In a typewriter, a support, a computer movably supported thereon, means carried by the computer for effecting travel of the computer on its support, means mounted on the support for retaining the computer against movement thereon under the influence of said travel-effecting means, and means including an actuating member mounted on and movable with the computer for releasing said computer against the action of said retaining means.

14. A structure of the kind described including in combination, a support, a computer relatively movable thereon in relation to columns on a work-sheet, means for maintaining the computer at rest at successive points in relation to the columns on the work-sheet, means carried by the computer for effecting a cycle of travel of the computer on its support successively from column to column and always in the same direction, an actuating member carried by the computer, and means under the control of the actuating member for releasing the computer from the rest-maintaining means whereby the computer may be shifted.

15. A structure of the kind described including in combination, a support and a computer relatively movable, an actuating member carried by the computer, means mounted on the support for maintaining the computer at rest, and means under the control of the actuating member for releasing the computer from the rest-maintaining means whereby the computer may be shifted.

16. In a typewriter, the combination of a support, a computer movably mounted thereon, computer-propelling mechanism for effecting travel of said computer on its support, a carriage mounted on the support independently of said computer and having letter-spacing movement in juxtaposition to said computer, an escapement mechanism mounted on said carriage and traveling therewith to control movement of the same when letter-spacing, a tabulator mounted on said carriage to travel therewith and operable to disconnect the escapement and thereby place the carriage under control of the tabulator and to release the computer for travel independently of the carriage.

17. A structure of the kind specified, including a sheet-supporting instrumentality, a carriage, a single computer shiftable in relation to said sheet-supporting instrumentality and having a plurality of operative positions with respect thereto and adapted to effect a columnar-computation at each of said positions and, also, a total-computation of all of said columnar-computations, and means on said carriage and computer normally inactive but adapted to be made active when the carriage and computer are brought into juxtaposition by a movement of one in relation to the other to effect conjoined movement of said carriage and computer transversely of said sheet-supporting instrumentality.

18. The combination, in a flat-platen typewriter, of a line-space carriage, a flat-platen over which the line-space carriage moves, a letter-space carriage supported by the line-space carriage and having letter-space movement over the platen, a computer supported by the line-space carriage independently of the letter-space carriage and having movement thereon, a lever carried by the computer, holding means carried by the computer, and shifting means also carried by the computer to shift it when the holding means is released by the operation of the lever thereon.

19. The combination, in a flat-platen typewriter, of a line-space carriage, a letter-space carriage having letter-space movement thereon, a bar mounted on said line-space carriage, spaced stops on the bar, a computer mounted on said line-space carriage independently of said letter-space carriage and having movement thereon, a lever carried by said computer, and means carried by said computer and engageable with the spaced stops when said lever is in its normal position and being free of said stops when said lever is out of normal position.

20. The combination, in a flat platen typewriter, of a flat-platen, a line-space carriage having line-space movement thereover, a letter-space carriage supported by the line-space carriage and having letter-space movement thereon, a computer sustained by the line-space carriage independently of the letter-space carriage and having movement thereon, a bar mounted on said line-space carriage, spaced stops on the bar, holding and moving means carried by said computer, said holding means being engageable with said spaced stops and held thereagainst by said moving means, and a lever carried by said computer and acting to release said holding means from the said stops and allow the moving means to shift the computer until again arrested by the holding means abutting against another stop.

21. The combination, in a flat-platen typewriter, of a flat-platen, a line-space carriage adapted to have movement thereover, a letter-space carriage supported by the line-space carriage and having movement thereon, a projection on said letter-space carriage, a computer supported by the line-space carriage independently of the letter-space carriage and having movement thereon, a bar mounted on the line-space carriage, spaced stops and cams on the bar, holding means carried by said computer and engageable with said stops, an actuating lever carried by said computer and operable to move said holding means away from said stops, moving means carried by the computer for holding the holding means against the stops and for moving the computer in the direction of the line of writing until again arrested by the holding means abutting against another stop when released from the lever, returning means carried by the computer and actuatable into the path of movement of the projection on the letter-space carriage by one of the cams on the bar, the projection during return of the letter-space carriage abutting against the returning means to cause return movement of the computer until the returning means is released from the projection on the letter-space carriage by another cam on the bar.

22. The combination, in a typewriter, of a line-space carriage, of a letter-space carriage shiftably mounted thereon, a computer movably mounted on said line-space carriage independently of said letter-space carriage, a series of stops mounted on said line-space carriage, means on said computer for engaging one of said stops, and means carried by said computer for holding said engaging means against the stop.

23. The combination, in a typewriter, of a line-space carriage, of a letter-space carriage mounted thereon, a bar provided with rack-teeth and mounted on said line-space carriage, a computer mounted on said line-space carriage and including a gear meshing with said rack, a pinion attached to said gear, a spring drum provided with gear teeth meshing with the pinion, and a spring for revolving said spring drum and gears whereby movement of the computer is effected.

24. The combination, in a typewriter, of a flat-platen, a line-space carriage having movement over said platen, a letter-space carriage having movement on the line-space carriage, a computer supported by said line-space carriage and having movement thereon, a spring drum carried by said computer for moving the same in the direction of the line of writing, a bar on said line-space carriage, stops and cams on the bar, a latch on said computer engageable with said stops, and a bell-crank on said computer and engageable with said cams and moved thereby.

25. The combination, in a flat-platen typewriter, of a line-space carriage, a letter-space carriage, a computer mounted on said line-space carriage independently of said letter-space carriage, a projection on said letter-space carriage, and a bell-crank on said computer and normally out of the path of movement of said projection and movable into the path of movement thereof and movable to permit the projection to pass in one direction when said bell-crank is in the path of said projection.

26. The combination, in a flat-platen typewriter, of a flat-platen, a line-space carriage, a letter-space carriage shiftably mounted on said line-space carriage, a computer shiftably mounted on said line-space carriage, means for moving the same, a bar mounted on said line-space carriage, spaced stops on the bar, a latch carried by said computer and engageable with said stops, and an actuating lever carried by said computer and operable to lift said latch away from said stops; the lever being also operable without lifting the latch away from said stops.

27. The combination, in a typewriter, of a line-space carriage, a letter-space carriage, a projection thereon, a computer mounted on said line-space carriage, means carried by said computer for moving the same in one direction, a bar on said line-space carriage, reverse-acting cams on the bar, a bell-crank mounted on said computer and movable into and out of the path of movement of the projection on said letter-space carriage, a tabulator mounted on said letter-space carriage to release and control the same, and spaced stops on said line-space carriage against which said tabulator and computer abut to position the same, said computer being releasable by said tabulator from said stops to cause one of the said cams to position said bell-crank into the path of movement of the projection on said letter-space carriage, said projection operating to return said computer with said letter-space carriage when said carriage is returned, the other cam releasing said bell-crank from said projection while said computer is being returned, and said computer-moving means operating to move said computer in a forward direction to abut against the first stop of the series when the bell-crank is released from the projection and while the letter-space carriage is moving in a reverse direction.

28. A structure of the kind described including in combination, a support, a series of stops carried thereby, a computer mounted on said support and movable thereon, stop-engaging means carried by the computer and normally engageable with one of said stops, and an operating means carried by the computer for disengaging said engageable means from an engaged stop.

29. A structure of the kind described including in combination, a support, a series of stops carried thereby, a computer movable on said support, stop-engaging means carried by the computer and normally engageable with one of said stops, and an actuating member also carried by the computer and which when operated simultaneously displaces the stop-engaging means from an engaged stop.

30. A structure of the kind described including in combination, a support, a carriage adapted to travel thereon, a computer adapted to travel on the support independently of said carriage, a series of stops on said support for arresting traveling movement of the computer, an actuating member carried by the computer and operable, when moved, to release the computer from an engaged stop, thus permitting the computer to have traveling movement until again arrested by another stop in said series.

31. A device for performing cross-footing including the usual computing-mechanism and controlling-mechanism therefor, both movable from column to column and relatively movable for the insertion of a number digit by digit, all of said movements being in the same direction, means for holding one of said mechanisms stationary while the other mechanism is moving step-by-step, and means for moving from column to column the mechanism which had been stationary.

32. A device for performing cross-footing including the usual computing-mechanism and controlling-mechanism therefor successively and severally movable to different column-zones, one of said mechanisms also having step by step movement in each column-zone for the purpose of inserting numbers digit by digit, all of said movements being in the same direction.

33. In a device for performing cross-footing having the usual computing mechanism and controlling mechanism therefor relatively movable for the insertion of a number, means for moving one of said mechanisms digit by digit while the other mechanism is stationary, and means for moving said other mechanism from column to column, both of said movements being in the same direction for the cross-footing operation.

34. In a machine for performing cross-footing computations, the combination of computing-mechanism and controlling-mechanism therefor relatively movable for the insertion of a number digit by digit in columns and also movable from column to column, both of said movements being in the same direction for the cross-footing operation, independent means for moving said mechanisms digit by digit and from column to column, and individual means for holding said mechanisms stationary while said moving means are not being operated and for holding said mechanisms against the action of said moving means.

35. In a device for performing cross-footing computations, the combination of computing and controlling mechanisms, means for moving one of said mechanisms digit by digit in a column and from column to column, means for holding said mechanism against the action of said moving means, means for moving the other mechanism from column to column, and means for holding that mechanism in a column, both of said movements being in the same direction for the cross-footing operation.

36. The combination in a machine for performing cross-footing computations, of computing-mechanism and controlling-mechanism therefor relatively movable for the insertion of numbers digit by digit in columns and also movable from column to column, both of these movements being in the same direction for the cross-footing operation, means for moving one of said mechanisms, and means for then holding that mechanism stationary in a column-position while the other of said mechanisms is moving space-by-space in said column.

37. The combination with a typewriter, of a platen, a carriage provided with computer-controlling mechanism and having movement over the platen, a computer having movement over the platen and arranged to be governed by said controlling mechanism, the movements of the computer and the controlling-mechanism being in the same direction for cross-footing operations, independent means for moving the carriage and computer in the same direction and at different times, and means for arresting the movements of said mechanisms independently of each other for the purpose of performing cross-footing computations.

38. The combination with a typewriter, of a flat platen, a supporting-carriage, a second carriage, computer-controlling mechanism movably mounted thereon, a computer movably mounted on the supporting-carriage, means for independently moving the carriage and computer, and means for independently arresting and holding the carriage and computer in predetermined positions for the purpose of performing cross-footing computations, said movements being in the same direction for cross-footing operations and including a digit-by-digit movement of one of said mechanisms and a column-to-column movement of another of said mechanisms.

39. The combination with a flat-platen typewriter, of a support, a carriage movably mounted thereon, computer-controlling instrumentalities disposed thereon, a computer movably mounted on the support in juxtaposition to said controlling instrumentalities and adapted to be operated thereby, means for moving the carriage and controlling instrumentalities, and means for moving the computer, one of said mechanisms having a letter-space movement and the other having a column-space movement, both of said movements being in the same direction for cross-footing operations.

In testimony whereof I affix my signature in presence of two witnesses.

EDWARD C. WALTER.

Witnesses:
 CHARLES P. BALL,
 H. W. AMBROSE.

Copies of this patent may be obtained for five cents each, by addressing the "Commissioner of Patents, Washington, D. C."